US008979389B2

(12) United States Patent
Ray et al.

(10) Patent No.: US 8,979,389 B2
(45) Date of Patent: Mar. 17, 2015

(54) FIBER OPTIC CABLE STRENGTH MEMBER BRACKET

(71) Applicant: All Systems Broadband, Inc., Livermore, CA (US)

(72) Inventors: Craig Dwayne Ray, Fuquay-Varina, NC (US); Timothy W. Dexter, Raleigh, NC (US)

(73) Assignee: All Systems Broadband, Inc., Livermore, CA (US)

( * ) Notice: Subject to any disclaimer, the term of this patent is extended or adjusted under 35 U.S.C. 154(b) by 0 days.

(21) Appl. No.: 14/038,239

(22) Filed: Sep. 26, 2013

(65) Prior Publication Data

US 2014/0270649 A1    Sep. 18, 2014

Related U.S. Application Data

(60) Provisional application No. 61/783,568, filed on Mar. 14, 2013.

(51) Int. Cl.
*G02B 6/00* (2006.01)
*G02B 6/44* (2006.01)
(52) U.S. Cl.
CPC ................... *G02B 6/4429* (2013.01)
USPC ............................. 385/81; 385/135
(58) Field of Classification Search
CPC ................ G02B 6/3887; H02G 3/32
USPC ............................. 385/76–82, 135
See application file for complete search history.

(56) References Cited

U.S. PATENT DOCUMENTS

| 5,754,724 | A  | * | 5/1998  | Peterson et al. | 385/135 |
| 5,793,920 | A  | * | 8/1998  | Wilkins et al.  | 385/135 |
| 5,835,658 | A  | * | 11/1998 | Smith           | 385/136 |
| 2006/0275006 | A1 | * | 12/2006 | Xin          | 385/134 |
| 2007/0261880 | A1 | * | 11/2007 | Cox et al.   | 174/138 F |
| 2012/0318933 | A1 | * | 12/2012 | Kimbrell et al. | 248/56 |

* cited by examiner

*Primary Examiner* — Eric Wong
(74) *Attorney, Agent, or Firm* — Murphy, Bilak & Homiller, PLLC

(57) ABSTRACT

A bracket for securing an end of a fiber optic cable, having at least one strength member, to a termination point includes a base portion at a first end of the bracket, a retention feature at a second end of the bracket that is opposite to the first end, and adapted to receive and at least partially surround an exposed end of the at least one strength member, and an elongated portion extending from the base portion to the retention feature. A first flat surface, on the base portion or the elongated portion, has at least one opening adapted to receive a fastener for mounting the strength member bracket to a first mounting surface on the termination point. A first flange is disposed along the elongated portion, and adapted to receive a tether for securing a jacketed portion of the fiber optic cable to the bracket.

20 Claims, 7 Drawing Sheets

FIBER OPTIC CABLE STRENGTH MEMBER BRACKET

TECHNICAL FIELD

The present invention generally relates to optical communications equipment, and particularly relates to techniques for terminating fiber optic cables at a subscriber termination point.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages over electrical transmission techniques, such as increased bandwidth and lower losses.

Fiber optic cables typically include a number of individual optical fibers surrounded by a cable jacket. The individual optical fibers act as a light waveguide between two ends of the cable. The individual optical fibers are susceptible to damage. Cable jackets provide a durable exterior around the optical fibers. Environmental conditions, such as changes in temperature, may cause expansion and contraction of cable polymers within the cable jacket. Cable jackets alone do not necessarily provide adequate protection of the optical fibers from forces that pull or push on the cable polymers.

Some modern fiber optic cables additionally include one or more strength members located inside the cable jacket. A strength member is non-data transmitting component of a fiber optic cable that provides desired structural characteristics to the fiber optic cable. For instance, strength members prevent optical fibers from being damaged due to tensile and compressive forces exerted on the fiber optic cable. In addition, strength members may provide desired separation between the optical fibers.

Fiber optic cables are connected to a desired location at a termination point. To make a working connection, the installer must first expose bare optical fibers by removing the cable jacket, optical fibers and other elements of the cable. The fibers are then spliced to terminal equipment. If a fiber optic cable that includes a strength member or strength members is used, the ends of the strength member must be exposed from the cable jacket. Exposed ends of strength members are problematic during an installation because the ends of the strength member may cause damage to the optical fibers.

SUMMARY

Embodiments disclosed herein relate to a strength member used for securing one or more exposed ends of strength members to a termination point where a splice of fiber optic cables may be effectuated. Advantageously, the strength member bracket helps reduce cable expansion and contraction at cut ends of a cable jacket by coupling the cable jacket and strength member(s) to a termination point. Additionally, the strength member bracket secures the end of strength member(s) away from exposed optical fibers and protects the exposed optical fibers from the strength member(s).

In one embodiment, a bracket for securing an end of a fiber optic cable, having at least one strength member, to a termination point is provided. The bracket includes a base portion at a first end of the bracket, a retention feature at a second end of the bracket opposite to the first end that is adapted to receive and at least partially surround an exposed end of the at least one strength member, and an elongated portion extending from the base portion to the retention feature. The bracket further includes a first flat surface, on the base portion or the elongated portion, having at least one opening adapted to receive a fastener for mounting the strength member bracket to a first mounting surface on the termination point. The bracket further includes a first flange, disposed along the elongated portion that is adapted to receive a tether for securing a jacketed portion of the fiber optic cable to the bracket.

In another embodiment, an assembly for securing an end of a fiber optic cable to a termination point is provided. The assembly includes a fiber optic cable having at least one strength member, optical fibers, and a cable jacket, wherein an end of the at least one strength member and ends of the optical fibers are exposed from the cable jacket. The assembly further includes a tether and a strength member bracket. The strength member bracket includes a retention feature at a first end of the bracket receiving and at least partially surrounding the exposed end of the at least one strength member, a base portion at a second end of the bracket that is opposite to the first end, and an elongated portion extending from the base portion to the retention feature. The strength member bracket further includes a first flat surface, on the base portion or the elongated portion, having at least one opening adapted to receive a fastener for mounting the strength member bracket to a first mounting surface on the termination point. The strength member bracket further includes a first flange receiving the tether, wherein the tether secures a jacketed portion of the fiber optic cable against the first flange, thus securing the fiber optic cable to the strength member bracket.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
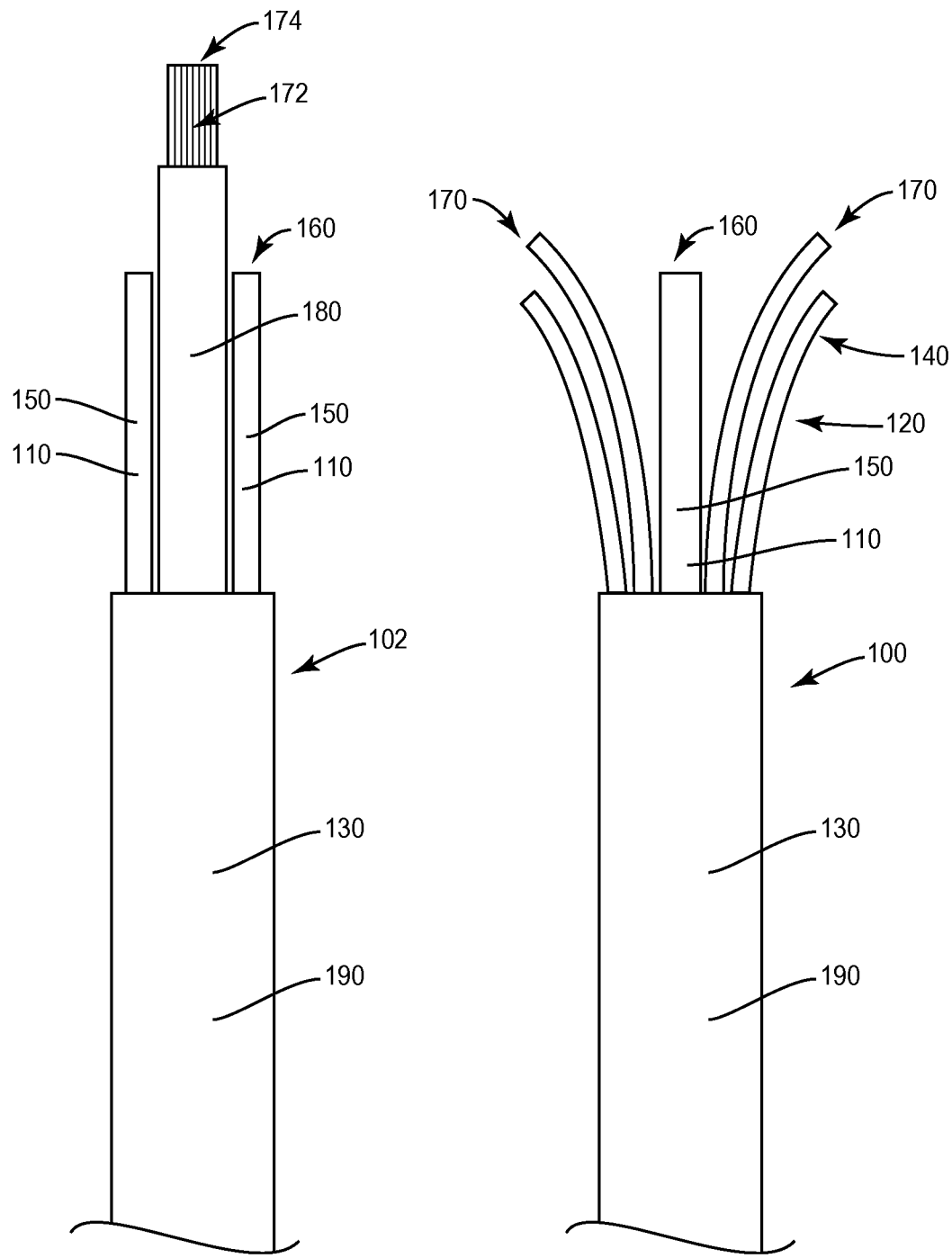
FIG. 1 illustrates the exposed ends of exemplary fiber optic cables having at least one strength member.

FIG. 1 depicts two exemplary fiber optic cables 100, 102 that are commonly used in a communication network. Fiber optic cable 100 is an exemplary an LBT (Loose Buffer Tube) cable. Fiber optic cable 100 includes a strength member 110, loose buffer tubes 120 and a cable jacket 130. The cable jacket 130 is pared back so exposed portions 140 of the loose buffer tubes 120 are accessible and so that an exposed portion 150 of the strength member 150 is accessible. The exposed portion 150 includes an The exposed portions 140, 150 of the loose buffer tubes 120 and strength member 110 include an exposed strength member end 160 and exposed buffer tube ends 170. Fiber optic cable 100 additionally includes jacketed portion 190. The jacketed portion 190 protects the internal components of the fiber optic cable 100 along a transmission path.

The fiber optic cable 102 is an exemplary ribbon fiber optic cable. Fiber optic cable 102 includes two strength members 110, ribbon fiber 172 and ribbon tube 180. The cable jacket 130 is pared back so that exposed portions 150 of the strength members 110 are exposed and so that ribbon tube 180 and ribbon fiber 172 are exposed. The exposed portions 140 of the strength member 110 include exposed strength member ends 160. The ribbon fiber 172 includes exposed ribbon fiber end 174.

The fiber optic cables 100, 102 have been prepared for termination. As shown, the exposed buffer tubes ends 170 and exposed ribbon fiber ends 174 may be spliced to a termination point, thus providing telecommunication service at a desired location. A jacketed portion 190 of the fiber optic cables 100, 100 protects the internal components of the fiber optic cable 100 along a transmission path.

The strength member or members 110 of the fiber optic cables 100, 102 are typically made from a material that is resistant to compressive and tensile forces such as glass reinforced plastic or equivalent. The loose buffer tubes 120 and ribbon fiber 172 include optical fibers that are typically made from a material that optimally transmits light, such as glass or plastic. Optical fibers are not ideally suited to withstand external tensile and compressive forces. Therefore, fiber optic cables 100, 102 should be mounted in such a manner to distribute external forces applied to the fiber optic cables 100, 102 between the jacketed portion 190 that includes strength members 110 and the mounting structure. In other words, fiber optic cable 100, 102 should be mounted in a manner that alleviates compressive and tensile forces from being applied to optical fibers contain in the loose buffer tubes 170 or the ribbon segment 172. Additionally, the exposed portion 150 of strength members 110 should be confined and/or secured so that exposed strength member ends 160 do not damage exposed portions 140 of loose buffer tubes 120 (in the case of fiber optic cable 100) or ribbon fiber 172 (in the case of fiber optic cable 102). Finally, strength member 110 should be coupled to the jacketed portion 190 to prevent the jacketed portion 190 from expanding and contracting in varying temperatures and thus causing undesired friction with the optical fibers of the fiber optic cables 100, 102.

Figure 2:
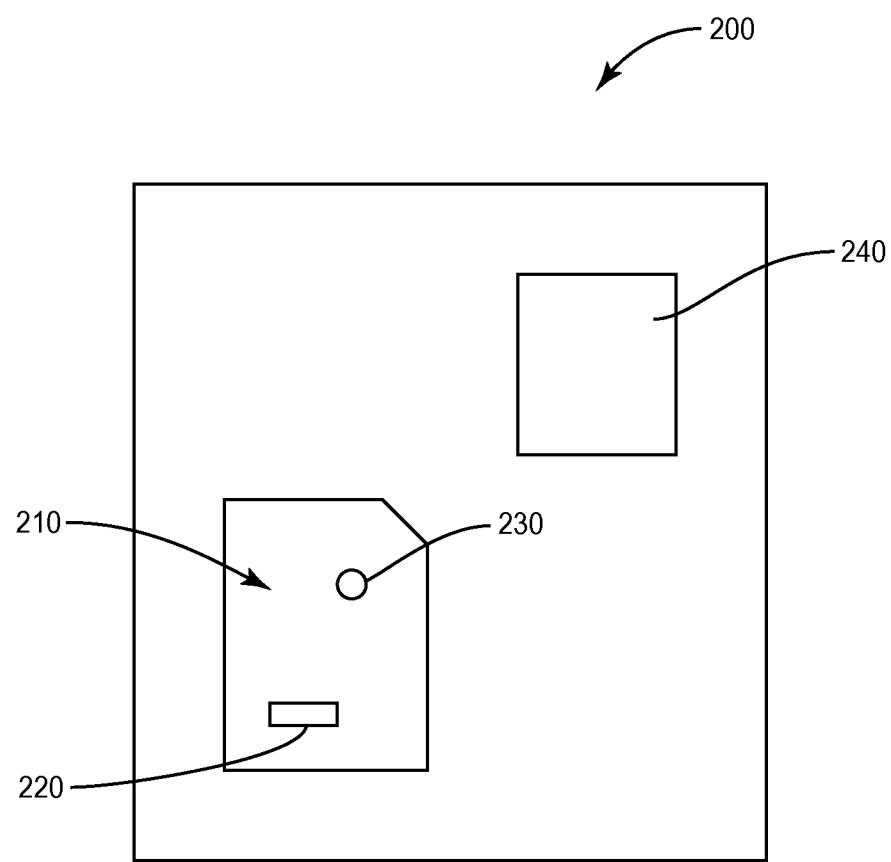
FIG. 2 illustrates an exemplary termination point for a fiber optic cable.

FIG. 2 illustrates termination point 200. Termination point 200 is an exemplary fiber optic termination box that may be used to terminate fiber optic cables 100, 102. Termination point 200 includes a mounting surface 210, tab opening 220, fastener opening 230 and optical fiber connection port 240. Depending on the application and/or network, a wide variety of structures may be suitable for terminating fiber optic cables 100, 102. Accordingly, the features of the termination point 200 may vary, depending on the particular components used to terminate the fiber optic cable 100, 102.

Figure 3:
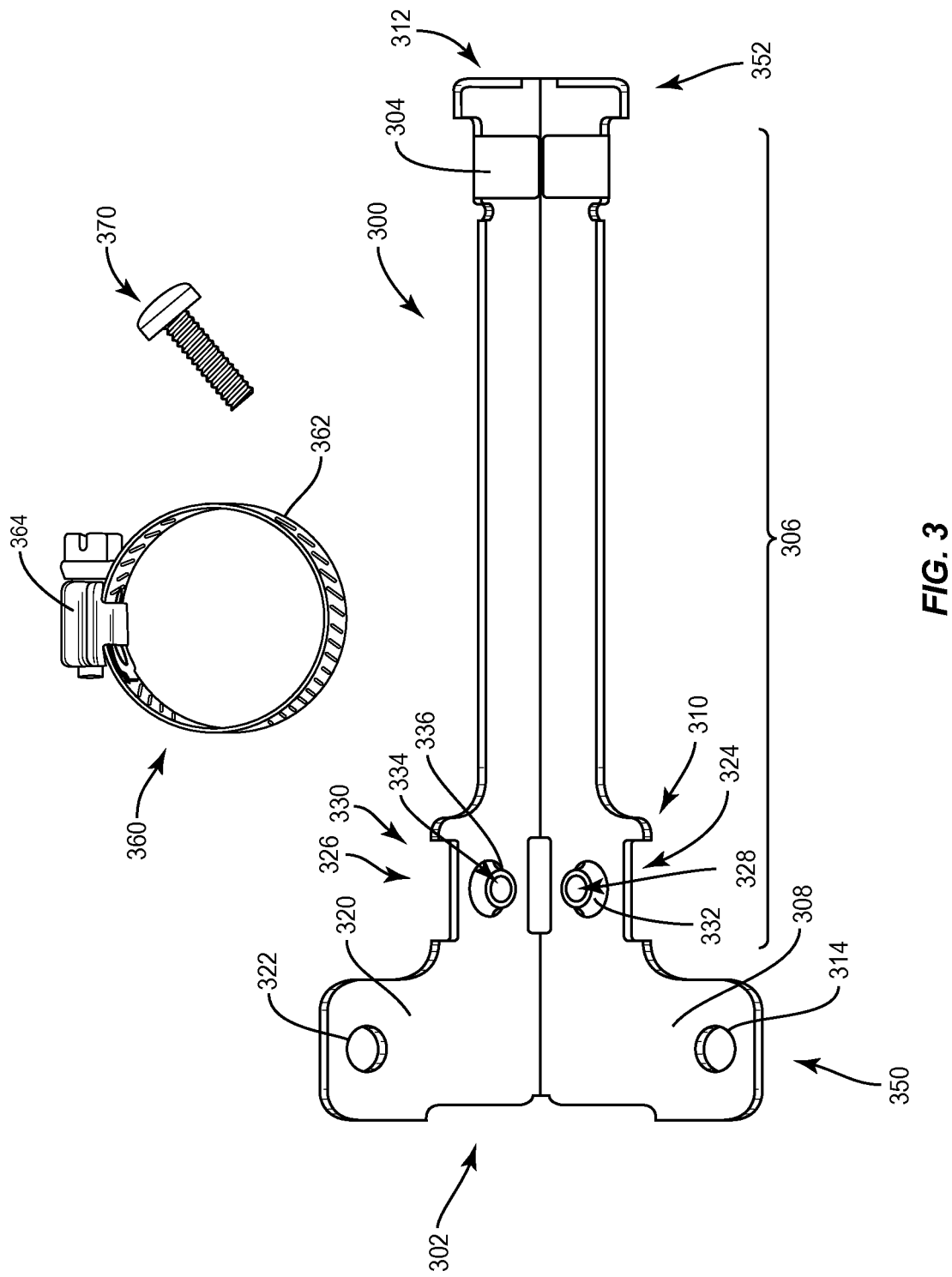
FIG. 3 illustrates a front perspective of an exemplary strength member bracket and components used to affix a fiber optic cable having a strength member to the strength member bracket.
Figure 4:
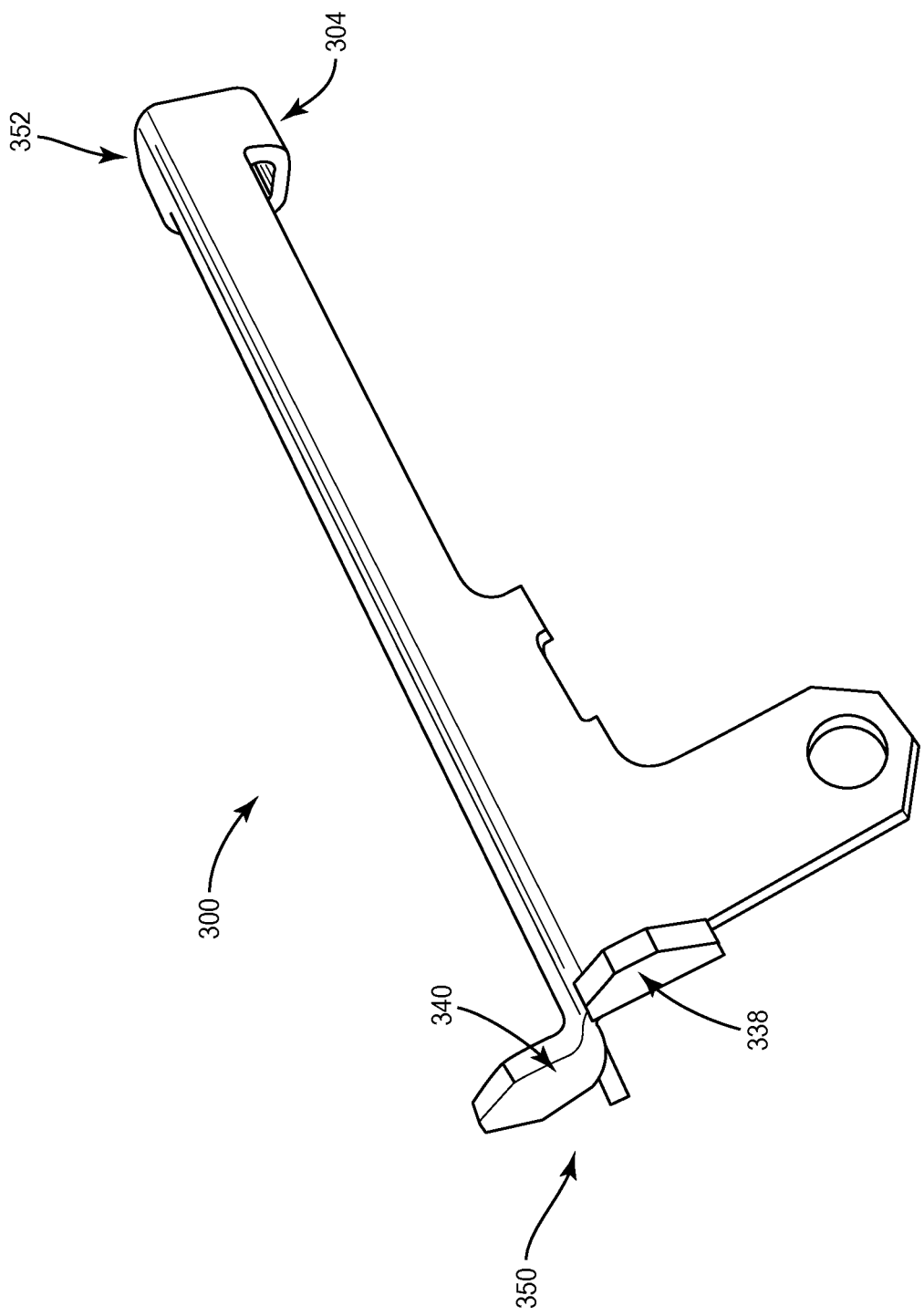
FIG. 4 illustrates a rear perspective of an exemplary strength member bracket.

FIGS. 3 and 4 illustrate an embodiment of a strength member bracket 300 from different perspectives. For the sake of simplicity, the features of the strength member bracket 300 shown in FIGS. 3 and 4 will be discussed with reference to their compatibility with fiber optic cable 100. However, one of ordinary skill will appreciate that the features of the strength member bracket 300 may provide similar advantages with respect to a variety of fiber optic cables, such as fiber optic cable 102.

Strength member bracket 300 includes a base portion 302, a retention feature 304, an elongated portion 306, a first flat surface 308 and a first flange 310. Base portion 302 is located at a first end 350 of the strength member bracket 300. Retention feature 304 is located at a second end 352 of the strength member bracket 300 that is opposite to the first end 350. Elongated portion 306 extends from the base portion 302 to the second end 352. First flange 310 is disposed on the elongated portion 306. First flat surface 308 is located on the base portion 302 or may optionally be located on the elongated portion 306. First flat surface 308 includes at least one opening 314.

Retention feature 304 is adapted to receive and at least partially surround the exposed portion of at least one strength member 110. Exposed strength member end 160 of strength member 110 is inserted into retention feature 304. When the exposed strength member end 160 of strength member 110 is received by retention feature 304, the strength member 110 is confined by the retention feature 304 and prevented from moving laterally in relation to the strength member bracket 300. This in turn protects the optical fibers of the fiber optic cables 100, 102 from damage by the exposed strength member end 160.

Optional tip portion 312 extends over the exposed strength member end 160 when at least one strength member 110 is received by the retention feature 304. Tip portion 312 further protects the optical fibers of the fiber optic cable 100 from damage by an exposed strength member end 160. In addition, tip portion 312 limits longitudinal movement of strength member 110 by preventing strength member 110 from moving past the second end 352 of strength member bracket 300. Thus, tip portion 312 distributes compressive forces exerted on the fiber optic cable 100 between strength member 110 and the strength member bracket 300. This configuration is advantageous since strength member 110 is ideally suited to receive compressive forces exerted on the fiber optic cable 100 in comparison to other components of the fiber optic cable 100.

FIG. 3 additionally depicts tether 360. As depicted in FIG. 3, tether 360 is a hose clamp. However, tether 360 may be any device suitable for securing jacketed portion 190 of fiber optic cable 100 to strength member bracket 300, such as a cable or tie. The tether 360 depicted in FIG. 3 includes circular portion 362 that wraps around the jacketed portion 190 of fiber optic cables 100, 102 and the exterior of strength member bracket 300. Tether 360 additionally includes tightening structure 364 that tightly secures fiber optic cable 100 to strength member bracket 300 when rotated. Circular portion 362 of tether 360 should optimally have a circumference that easily fits around the jacketed portion 190 and strength member jacket 100 and can be securely tightened thereafter.

First flange 310 is adapted to receive the tether 360 for securing the jacketed portion 190 of the fiber optic cable 100 to the strength member bracket 300. According to an embodiment, the first flange 310 is adapted to receive a hose clamp. As previously explained, tether 360 may be another structure, such as a cable or tie. Accordingly, the first flange 310 may be adapted in any manner to receive a suitable device for securing jacketed portion 190 of fiber optic cable 100. First flange 310 provides a relatively strong portion of strength member bracket 300 from which to secure fiber optic cable 100 to the strength member bracket 300. As depicted in FIG. 3, the first flange 310 has more surface area than the rest of elongated portion 306 and thus provides a better surface for distributing the forces applied by the fiber optic cable 100 and the tether 360. First flange 310 additionally provides a larger surface area from which to secure the fiber optic cable 100 against the strength member bracket 300.

According to an embodiment, the first flange 310 includes a recessed area 324. The recessed area 324 is ideally dimensioned slightly larger than the circular portion 362 of the tether 360, allowing the tether 360 to fit securely inside the recessed area 324. As previously explained, tether 360 may vary in type, shape or size. Correspondingly, the recessed area 324 is ideally dimensioned slightly larger than the width of the desired tether 360. When the tether 360 is tightened in the recessed area 324, the tether 360 is prevented from moving towards either end 350, 352 of the strength member bracket 300. Thus, the recessed area 324 of the first flange 310 further ensures a secure connection between the fiber optic cable 100, the strength member bracket 300 and the tether 360.

According to an embodiment, the first flange 310 includes openings 328 having edges 332. As depicted in FIG. 3, the openings 328 are circular in shape. However, the openings 328 may be any shape, such as square or triangular. As shown in FIG. 3, openings 328 provide edges 332. Optionally, edges 332 may be formed in the first flange 310 without perforation of the flange, i.e. without openings 328. Edges 332 slightly entrench into the jacketed portion 190 of the fiber optic cables 100, 102 when the jacketed portion 190 is pressed against the first flange 310. Thus, the edges 332 provide a gripping mechanism to maintain the position of the fiber optic cables 100, 102 when the tether 360 is being tightened and prohibit movement of the fiber optic cable 100 thereafter.

The embodiment depicted in FIG. 3 includes an optional second flange 330. Second flange 330 extends out from the elongated portion 306 substantially perpendicular to the first flange 310. This embodiment allows for better structural integrity and ease of tethering in contrast to a one flange configuration. Second flange 330 is dimensioned similar to first flange 310 and includes recessed area 326. Second flange 330 provides an additional relatively strong portion of strength member bracket 300 from which to secure jacketed portion 190 of fiber optic cables 100, 102 to the strength member bracket 300. Recessed area 326 of second flange 330 allows for an additional surface to tightly secure circular portion 362 of tether 360 and prevented tether 360 from moving towards either end of the strength member bracket 300. Second flange 330 optionally includes opening 334 having edges 336 that are dimensioned similar to opening 328 and edges 332 of first flange 310. The edges 336 further provide for a secure connection between the fiber optic cable 100, the strength member bracket 300 and the tether 360.

FIG. 3 additionally depicts fastener 370. As shown in FIG. 3, fastener 370 is a screw. However, fastener 370 may be any device suitable for mounting strength member bracket 300 to a mounting surface 210, such as a bolt, pin or brace.

First flat surface 308 includes at least one opening 314 adapted to receive the fastener 370 for mounting the strength member bracket 300 to the mounting surface 210. According to an embodiment, the opening 314 of the first flat surface 308 is adapted to receive a screw. As previously explained, fastener 370 may be any kind of fastening device, such as a bolt, pin or brace. Likewise, the opening 314 of the first flat surface 308 may be adapted to receive any desired fastening device. Strength member bracket 300 is mounted to the mounting surface 210 by tightly securing the fastener 370 in the at least one opening 314 of first flat surface 314 and the fastener opening 230 of the mounting surface 210. When the strength member bracket 300 is mounted to the first mounting surface 210, the first flat surface 308 is flush against the first mounting surface 210.

According to an embodiment, strength member bracket 300 includes a second flat surface 320. Second flat surface 320 includes at least one opening 322 adapted to receive an additional fastener 370 for mounting the strength member bracket 300 to the mounting surface 210 on the termination point 200. Similar to opening 314, opening 320 may be adapted to receive any desired fastening device, such as a bolt, pin or brace.

Second flat surface 320 provides an additional surface, aside from first flat surface 308, to mount strength member bracket 300 to the first mounting surface 210. Second flat surface 320 is substantially perpendicular to the first flat surface 308. The substantially perpendicular angle between first flat surface 308 and second flat surface 320 allows for more configurations to possibly mount strength member bracket 300 at a more desirable angle. Ideally, strength member bracket is installed at an orientation that aligns the fiber optic cable 100 with minimal twisting forces. Thus, the second flat surface 320 provides an alternative position to optimally align the fiber optic cable 100 while providing an accessible opening 314, 322 to insert fastener 370. Additionally, the substantially perpendicular surfaces allow for mounting against more than one surface of a terminal structure, with at least one fastener 370 in each of the at least one openings 314, 322 of first and second flat surfaces 308, 320. This mounting configuration is advantageous over the aforementioned single flat surface mounting configuration because external forces are distributed across more than one location of the strength member bracket 300.

FIG. 4 depicts a rear perspective of the strength member bracket 300. According to an embodiment, strength member bracket 300 includes optional tabs 338, 340. Tabs 338, 340 extend away from the fiber optic cable 100 when the fiber optic cable 100 is received by the base portion 308 of strength member bracket 300. Tabs 338, 340 are adapted to fit in the tab opening 220 in mounting surface 218 of termination point 200. Tabs 338, 340 provide additional structural support between strength member bracket 300 and mounting surface 218. Additionally, tabs 338, 340 limit rotation of the strength member bracket 300 when the fiber optic cable 100 is pushed or pulled. According to an embodiment, tabs 338, 340 are aligned with an axis of the fiber optic cable 100.

As shown in FIG. 4, tabs 338, 340 are essentially flat and become narrower toward the ends. Tabs 338, 340 can be square, or circular or any shape suitable to be received by the tab opening 220. The number of tabs 338, 340 can likewise vary, depending on the mounting receptacle.

Figure 5:
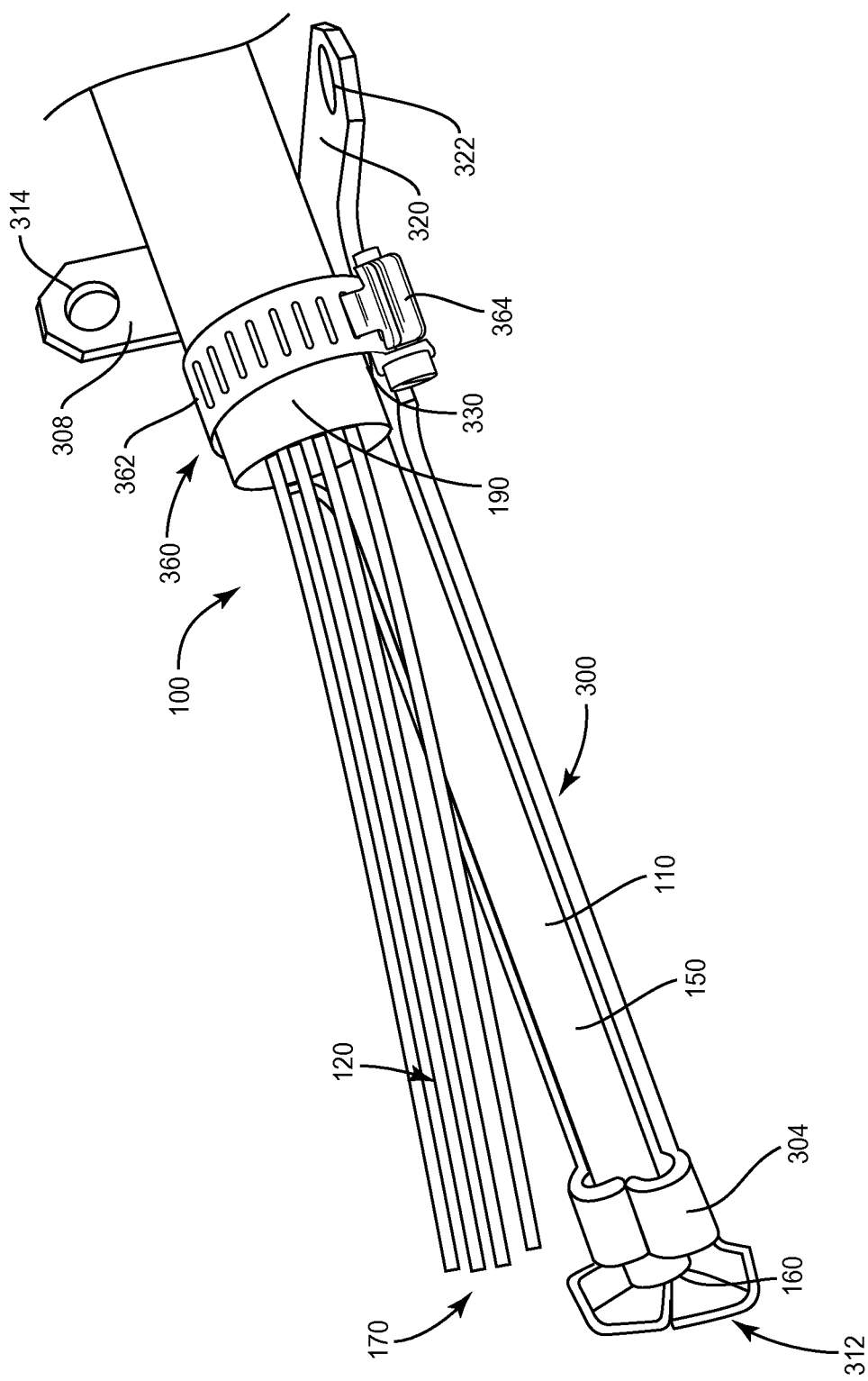
FIG. 5 illustrates an exemplary assembly for securing an end of a fiber optic cable having one strength member to a termination point.

FIG. 5 illustrates an assembly of strength member bracket 300, fiber optic cable 100 and tether 360. The exemplary assembly of FIG. 5 may be used to secure an end the fiber optic cable 100 to termination point 200. As can be seen, the exposed strength member end 160 of strength member 110 is received by and partially surrounded by the retention feature 304. Loose buffer tubes 120 are released from the strength member bracket 300 so that loose buffer tubes ends 170 may be terminated at optical fiber connection port 240 of termination point 200.

Tether 360 secures the jacketed portion 190 of the fiber optic cable 100 to the first flange 310, thus securing the fiber optic cable 100 to the strength member bracket 300. Tether 360 is received by the first and second flanges 310, 330 of the strength member bracket 300. First and second flanges 310, 330 provide a relatively strong portion of strength member bracket 300 from which to secure fiber optic cable 100 to the strength member bracket 300. As shown in FIG. 4, tether 360 is tightened in recessed areas 324, 326.

Figure 6:
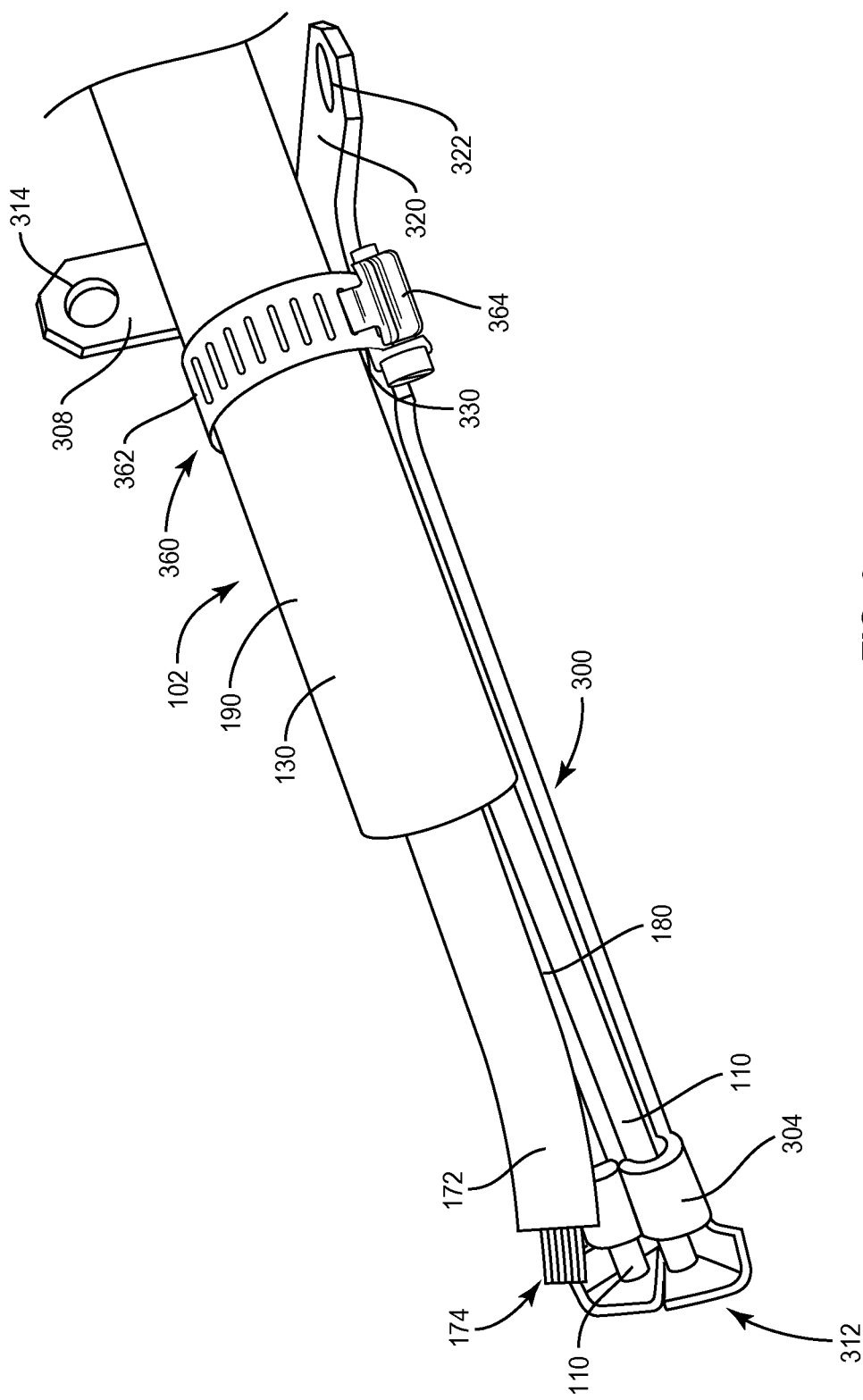
FIG. 6 illustrates an exemplary assembly for securing an end of a fiber optic cable having two strength members to a termination point.

FIG. 6 illustrates an assembly of strength member bracket 300, fiber optic cable 102 and tether 360. In a similar manner as discussed above with reference to FIG. 5, the exemplary assembly of FIG. 6 may be used to secure an end the fiber optic cable 102 to termination point 200. As shown, two exposed strength member ends 110 are received by and partially surrounded by the retention feature 304. Ribbon fiber 172 is released from the strength member bracket 300 so exposed ribbon fiber end 174 may be terminated at optical fiber connection port 240 of termination point 200. In a similar manner as discussed above with reference to FIG. 5, the tether 360 is used to secure the jacketed portion 190 of the fiber optic cable 102 to the flanges 310, 330 of the strength member bracket 300.

Figure 7:
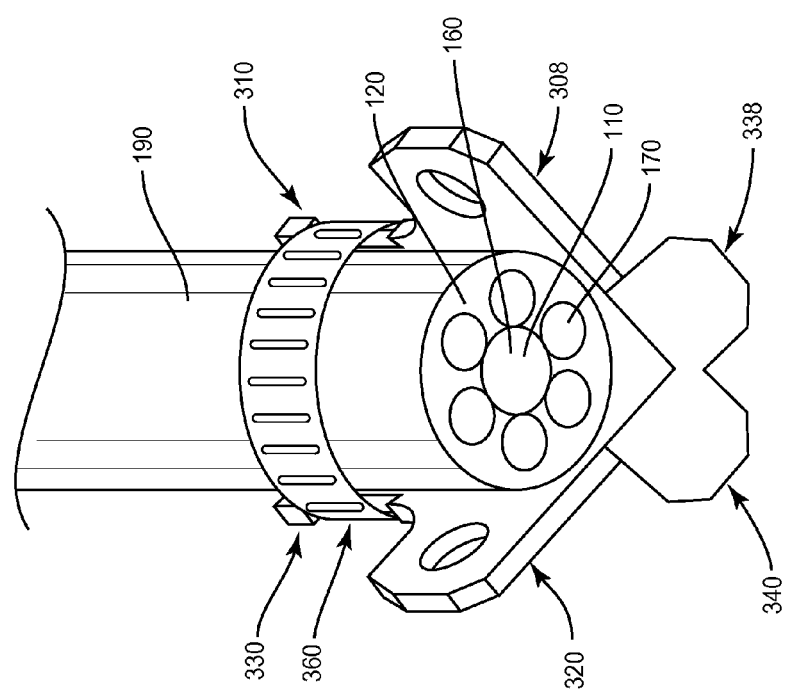
FIG. 7 illustrates a cross-sectional view a fiber optic cable having one strength member secured to a strength member bracket by a tether.

FIG. 7 depicts a cross-sectional view of fiber optic cable 100 cable secured to strength member bracket 300 with tether 360. As can be seen, the substantially perpendicular angle between the first and second flat surfaces 308, 320, as well as between the first and second flanges 310, 330 provides a region to receive jacketed portion 190 of fiber optic cable 100. The substantially perpendicular angle allows jacketed portion 190 of fiber optic cable 100 to fit securely in strength member bracket 300. The angle between the first and second flat surfaces 308, 320, as well as the first and second flanges 310, 330 does not have to be at precisely 90 degrees. Rather, any angle which provides a relatively suitable receptacle for jacketed portion 190 of the fiber optic cable 100 and tether 360 is possible.

The fiber optic cables 100, 102 are exemplary fiber optic cables and many different configurations are alternatively used in a fiber optic network. For instance, the number of strength members 110, buffer tubes 120 or ribbon fibers 172 may vary, and the size and shape of these components may vary as well. Features that are not depicted, such as plastic coatings, may also be included in fiber optic cables 100, 102. The strength member bracket disclosed may be used to secure any of these cables of varying type to a termination point.

In general, strength member bracket 300 is dimensioned to be compatible with the other exemplary components discussed herein, such as fiber optic cables 100, 102 the tether 360, the fastener 370 and the mounting surface 210. For instance, the first and second flanges 310, 330 provide a surface to securely tighten a fiber optic cable to a termination point. Accordingly, first and second flanges 310, 330 should be optimally sized to provide significant surface area to form a secure connection with a fiber optic cable. In other words, thicker fiber optic cables ideally require larger sized flanges 310, 330 to accommodate the fiber optic cable.

According to an embodiment, the entire length of strength member bracket 300 (i.e. the distance from the first end 350 to the second end 352) is between 90 and 120 millimeters. According to an embodiment, the entire length of strength member bracket 300 is approximately 108.5 millimeters.

According to an embodiment, the first flange 310 has a length (i.e. the distance from an end of first flange 310 closest to the first end 350 of strength member bracket 300 to an end of first flange 310 furthest from the first end 350 of strength member bracket 300) of between 10 and 20 millimeters. According to an embodiment, the first flange 310 has a length of approximately 14 millimeters. According to an embodiment, the first flange 310 has a width (i.e. the distance between an inner intersection of first flange 310 and second flange 330 and an end of the first flange 310 furthest away from the inner intersection) of between 10 and 14 millimeters. According to an embodiment, the first flange 310 has a width of approximately 11.7 millimeters.

First and second flat surfaces 308, 320 ideally have a sufficient surface area to distribute the mounting forces applied by the fastener 370 and the mounting surface 210 to the strength member bracket 300 in order to maintain the structural integrity of the strength member bracket 300. According to an embodiment, the first flat surface 308 has a width (i.e. the distance from an inner intersection of the first flat surface 308 and the second flat surface 320 to an end of the first flat surface 308 furthest away from the inner intersection) of between 25 and 30 millimeters. According to an embodiment, the first flat surface 308 has a width of approximately 27.9 millimeters. According to an embodiment, the first flat surface 308 has a length (i.e. the distance from an end of first flat surface nearest to the first end 350 to an end of first flat surface 308 furthest away from the first end 350) of between 10 and 20 millimeters. According to an embodiment, the first flat surface 308 has a length of approximately 15.5 millimeters.

The elongated portion 306 should ideally be long enough to allow for the exposed portions of a fiber optic cable to be easily manipulated. In addition, the elongated portion 306 should ideally be long enough to allow for enough room to easily insert at least one strength member strength member 110 into retention feature 304. According to an embodiment, the elongated portion 306 is between 70 and 90 millimeters. According to an embodiment, the elongated portion 306 is approximately 79.5 millimeters.

Retention feature 304 is dimensioned to retain and at least partially surround the exposed strength member ends 160 of at least one strength member 110. According to an embodiment, retention feature 304 is dimensioned to retain and at least partially surround the exposed strength member ends 160 of two strength members 110. According to an embodiment, the length of retention feature 304 (i.e. the distance between an end of retention feature 304 closest to the first end 350 and an end of retention feature 304 furthest away from the first end 350) is between 5 and 10 millimeters. According to an embodiment, the length of retention feature 304 is approximately 7.0 millimeters.

First flat surface 308 and first flange 310 are thick enough to sustain the mounting forces applied by fastener 370 and tether 360. According to an embodiment, the thickness of the First flat surface 308 and first flange 310 are selected to be substantially similar to the wall material thickness of the termination point 200. This configuration provides parity between the resistance to mounting forces between the strength member bracket 300 and the termination point 200. Stronger materials, such as aluminum, may allow for reduced thicknesses of first flat surface 308 and first flange 310. Likewise, weaker materials may require increased thicknesses of first flat surface 308 and first flange 310. Other considerations, such as weight and cost may factor into the desired thickness. In the embodiments depicted, the features of the strength member bracket 300 are substantially uniform of thickness. This reduces cost and allows for the strength member bracket 300 to be made from a single sheet of substantially uniform thickness material. However, the individual features do not necessarily require the same thickness. According to an embodiment, the first surfaces 308 and the first flanges 310 are between 1.5 and 2.5 millimeters thick. According to an embodiment, the first surfaces 308 and the first flanges 310 are approximately 2.0 millimeters thick.

Strength member bracket 300 may be made from any material suitable for forming the features discussed herein, such as steel, aluminum or any other formable material. The material of strength member bracket 300 ideally has sufficient strength to resist the forces exerted by the fiber optic cable 100. According to an embodiment, strength member bracket 300 is manufactured to resist forces of 100 pounds, exerted either by the jacketed portion 190 and the strength member 110 or by forcers exerted on fiber optic cable 100, as required per Telecordia Specification GR-771. Strength member bracket 300 may be made formed from a flat pattern. The shape and contours of strength member bracket 300 may be punched and then bent into shape by either hand or break.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A bracket for securing an end of a fiber optic cable, having at least one strength member, to a termination point, comprising:
   a base portion at a first end of the bracket;
   a retention feature at a second end of the bracket that is opposite to the first end and adapted to receive and at least partially surround an exposed end of the at least one strength member;
   an elongated portion extending from the base portion to the retention feature;
   a first flat surface, on the base portion or the elongated portion, having at least one opening adapted to receive a fastener for mounting the strength member bracket to a mounting surface on the termination point; and
   a first flange, disposed along the elongated portion and adapted to receive a tether for securing a jacketed portion of the fiber optic cable to the bracket.

2. The bracket of claim 1, wherein the retention feature is adapted to receive and at least partially surround exposed ends of two strength members.

3. The bracket of claim 1, further comprising a second flat surface substantially perpendicular to the first flat surface, and having at least one opening adapted to receive a fastener for mounting the strength member bracket to a mounting surface on the termination point.

4. The bracket of claim 1, further comprising a second flange substantially perpendicular to the first flange and adapted to receive the tether.

5. The bracket of claim 1, wherein the first flange includes an opening having edges that grip the jacketed portion of the fiber optic cable when the jacketed portion is securely tethered to the flange.

6. The bracket of claim 1, wherein the first flange includes a recessed area adapted to prevent the tether from moving towards either end of the strength member bracket.

7. The bracket of claim 1, wherein the retention feature includes a tip portion that extends over the end of the at least one strength member when the at least one strength member is received by the retention feature.

8. The bracket of claim 1, wherein the base portion includes at least one tab that extends away from the fiber optic cable when the fiber optic cable is received by the base portion, and is adapted to fit in an opening in the termination point.

9. The bracket of claim 1, wherein the at least one opening on the first flat surface is adapted to receive a screw.

10. The bracket of claim 1, wherein the first flange is adapted to receive a hose clamp.

11. An assembly for securing an end of a fiber optic cable to a termination point, comprising:
    a fiber optic cable comprising at least one strength member, optical fibers, and a cable jacket, wherein an end of the at least one strength member and ends of the optical fibers are exposed from the cable jacket;
    a tether; and
    a strength member bracket, comprising:
      a retention feature at a first end of the bracket receiving and at least partially surrounding the exposed end of the at least one strength member;
      a base portion at a second end of the bracket that is opposite to the first end;
      an elongated portion extending from the base portion to the retention feature;
      a first flat surface, on the base portion or the elongated portion, having at least one opening adapted to receive a fastener for mounting the strength member bracket to a mounting surface on the termination point; and
      a first flange disposed along the elongated portion and receiving the tether, wherein the tether secures a jacketed portion of the fiber optic cable against the first flange, thus securing the fiber optic cable to the strength member bracket.

12. The assembly of claim 11, wherein the wherein fiber optic cable has two strength members having ends exposed from the cable jacket and the retention feature receives and at least partially surrounds the exposed ends of the two strength members.

13. The assembly of claim 11, further comprising a second flat surface substantially perpendicular to the first flat surface, and having at least one opening adapted to receive a fastener for mounting the strength member bracket to a mounting surface on the termination point.

14. The assembly of claim 11, further comprising a second flange substantially perpendicular to the first flange, and receiving the tether.

15. The assembly of claim 11, wherein the first flange includes an opening having edges that grip the jacketed portion of the fiber optic cable.

16. The assembly of claim 11, wherein the first flange includes a recessed area adapted to prevent the tether from moving towards either end of the strength member bracket and the tether is securely fastened in the recessed area.

17. The assembly of claim 11, wherein the retention feature includes a tip portion that extends over the end of the at least one strength member.

18. The assembly of claim 11, wherein the base portion includes at least one tab that extends away from the fiber optic cable and is adapted to fit in an opening in the termination point.

19. The assembly of claim 11, wherein the at least one opening on the first flat surface is adapted to receive a screw.

20. The assembly of claim 11, wherein the tether is a hose clamp.

* * * * *